(12) United States Patent
Brooks et al.

(10) Patent No.: US 10,404,052 B2
(45) Date of Patent: Sep. 3, 2019

(54) SYSTEMS AND METHODS FOR HANDLING OVERCURRENT AND UNDERCURRENT CONDITIONS IN SUBSEA CONTROL SUBSYSTEM COMPONENTS

(71) Applicant: Hydril USA Distribution, LLC, Houston, TX (US)

(72) Inventors: Ronald Dean Brooks, Houston, TX (US); Steven James Ronan, Houston, TX (US); An Nguyen, Houston, TX (US)

(73) Assignee: Hydril USA Distribution, LLC, Houston, TX (US)

(*) Notice: Subject to any disclaimer, the term of this patent is extended or adjusted under 35 U.S.C. 154(b) by 393 days.

(21) Appl. No.: 15/147,670

(22) Filed: May 5, 2016

(65) Prior Publication Data

US 2016/0329697 A1  Nov. 10, 2016

Related U.S. Application Data

(60) Provisional application No. 62/158,364, filed on May 7, 2015.

(51) Int. Cl.
*H02H 3/10* (2006.01)
*E21B 33/064* (2006.01)
(Continued)

(52) U.S. Cl.
CPC ........... *H02H 3/10* (2013.01); *E21B 33/0355* (2013.01); *E21B 33/064* (2013.01); *E21B 34/16* (2013.01); *H01F 7/064* (2013.01)

(58) Field of Classification Search
CPC .............. B60T 2270/406; B60T 8/885; E21B 33/0355; E21B 33/06; E21B 33/064;
(Continued)

(56) References Cited

U.S. PATENT DOCUMENTS

| 4,953,056 A | 8/1990 | Yakuwa et al. |
| 5,079,750 A | 1/1992 | Scherbatskoy |

(Continued)

FOREIGN PATENT DOCUMENTS

EP    2565366 A2    3/2013

OTHER PUBLICATIONS

Cai, Baoping, et al., "Optimization of Submersible Solenoid Valvel for Subsea Blowout Preventers" IEEE Transaction on Magnetics, vol. 47, No. 2, Feb. 2011; pp. 451-458.
(Continued)

*Primary Examiner* — Thienvu V Tran
*Assistant Examiner* — Nicolas Bellido
(74) *Attorney, Agent, or Firm* — Hogan Lovells US LLP (57) ABSTRACT

Systems, methods, and computer readable media for handling overcurrent and undercurrent conditions in subsea control subsystem components include determining, by a current sensor operatively coupled to a solenoid valve, that an input current to the solenoid is greater or lower than a predetermined threshold value, de-energizing, by a processor operatively coupled to the current sensor, the solenoid for a first period of time, re-energizing the solenoid at least three times after the first period of time, determining, by the current sensor, that during each of the at least three times the input current to the solenoid is greater or lower than the predetermined threshold value, and de-energizing the solenoid and transmitting a control signal to a control unit.

20 Claims, 8 Drawing Sheets

(51) Int. Cl.
*H01F 7/06* (2006.01)
*E21B 33/035* (2006.01)
*E21B 34/16* (2006.01)

(58) Field of Classification Search
CPC .... E21B 34/066; E21B 34/16; E21B 41/0007; E21B 44/00; E21B 47/0001; F16H 2061/1208; F16H 2061/1268; G01R 31/06; H01F 2007/185; H01F 2007/1861; H01F 2007/1888; H01F 7/064; H01F 7/1844; H02H 3/10
See application file for complete search history.

(56) References Cited

U.S. PATENT DOCUMENTS

| | | | |
|---|---|---|---|
| 5,717,562 A | 2/1998 | Antone et al. | |
| 5,847,274 A | 12/1998 | Schaffer | |
| 7,656,641 B2* | 2/2010 | Mason, Jr. | H01H 47/32 361/160 |
| 8,542,006 B2* | 9/2013 | Liu | G01D 5/2013 324/207.16 |
| 10,018,007 B2* | 7/2018 | Panicker-Shah | E21B 33/0355 |
| 2005/0066940 A1 | 3/2005 | Sheikh et al. | |
| 2012/0106019 A1 | 5/2012 | Buxton | |
| 2012/0197527 A1* | 8/2012 | McKay | E21B 41/0007 702/6 |
| 2012/0212230 A1* | 8/2012 | Davis | E21B 33/0355 324/418 |
| 2013/0054034 A1* | 2/2013 | Ebenezer | E21B 33/06 700/282 |
| 2015/0096758 A1* | 4/2015 | Babbitt | E21B 33/064 166/335 |
| 2015/0184505 A1 | 7/2015 | Panicker-Shah | |

OTHER PUBLICATIONS

Shanks et al., "OTC 23473 New Generation Control System for 20 KSI Subsea BOP", Offshore Technology Conference, Houston Texas, pp. 1-12, May 3, 2012.

Shanks et al., BOP MUX Control System: Comparing Embedded Computer Based Versus PLC Hybrid System for Maximum Reliability, Offshore Technology Conference, Houston Texas, pp. 1-10, May 9, 2013.

A PCT Search Report and Written Opinion issued in connection with Corresponding PCT Application No. PCT/US2016/031148 dated Jul. 27, 2016.

* cited by examiner

SYSTEMS AND METHODS FOR HANDLING OVERCURRENT AND UNDERCURRENT CONDITIONS IN SUBSEA CONTROL SUBSYSTEM COMPONENTS

CROSS-REFERENCE TO RELATED APPLICATIONS

The present application is a non-provisional application which claims priority to and the benefit of U.S. Provisional Application No. 62/158,364, filed on May 7, 2015 and titled "Methods of handling a solenoid overcurrent and undercurrent condition," the disclosure of which is incorporated herein in its entirety.

BACKGROUND

Field of the Invention

This invention relates generally to subsea control subsystem management, and in particular to handling overcurrent and undercurrent conditions in subsea control subsystem components.

Description of the Related Art

Certain control systems for subsea blow out preventers (BOPS) are designed to be fault tolerant and fault recoverable. If a fault occurs, both the hardware and software must sense the occurrence, react to mitigate it, recover from it, and if need be, allow the operator to isolate the faulty component. Some known solenoid driver board designs do not offer a way to identify the functionality of the electrical circuit providing power to a solenoid operated valve (commonly referred to as a solenoid valve) prior to applying power. Because of the lack of this feature, in some systems the only way to determine the solenoid valve's functionality is to apply power activating the solenoid valve.

There may be several outcomes when such power is applied, including the system may operate properly, activating the hydraulic function; the system may not operate properly, not activating the hydraulic function due to an overcurrent condition, or short circuit; or the system may not operate properly, not activating the function due to an undercurrent condition, or open circuit.

SUMMARY

In view of the foregoing, embodiments of the present invention advantageously provide systems, methods, and computer readable medium having computer programs stored therein (program products) to allow proper handling of overcurrent and undercurrent conditions in subsea control subsystem components.

One example embodiment is a system for handling an overcurrent condition in subsea control subsystem components. The system includes a blowout preventer (BOP) including one or more solenoid valves operably disposed within the BOP, each of the one or more solenoid valves configured to close upon energization of a respective one or more solenoids associated with the one or more solenoid valves, the BOP further including a plurality of downstream BOP components, one or more of the plurality of downstream BOP components being activated following energization of the respective one or more solenoids associated with the one or more solenoid valves, the BOP further including a pair of control pods to control downstream BOP components, one or more current sensors operably connected to the one or more solenoid and configured to measure input current going into the one or more solenoids, one or more processors operatively coupled to the one or more current sensors, and a non-transitory computer-readable medium in communication with the one or more processors and having stored thereon a set of instructions that when executed cause the one or more processors to perform operations including determining that an input current to the one or more solenoids is greater than a predetermined threshold value, de-energizing the solenoid for a first period of time, re-energizing the solenoid at least three times after the first period of time, determining that during each of the at least three times the input current to the one or more solenoids is greater than the predetermined threshold value, and de-energizing the one or more solenoids and transmitting a first signal to the control pod.

Another example embodiment is a method for handling an overcurrent condition in a solenoid. The method includes determining, by a current sensor operatively coupled to the solenoid, that an input current to the solenoid is greater than a predetermined threshold value, de-energizing, by a processor operatively coupled to the current sensor, the solenoid for a first period of time, re-energizing, by the processor, the solenoid at least three times after the first period of time, determining, by the current sensor, that during each of the at least three times the input current to the solenoid is greater than the predetermined threshold value, and de-energizing, by the processor, the solenoid and transmitting a first signal to a control unit.

Another example embodiment is a non-transitory computer-readable medium including instructions stored thereon, which when executed by one or more processors operatively coupled to a current sensor configured to measure an input current going into a solenoid, cause the one or more processors to perform operations including determining that the input current to the solenoid is greater than a predetermined threshold value, de-energizing the solenoid for a first period of time, re-energizing the solenoid at least three times after the first period of time, determining that during each of the at least three times the input current to the solenoid is greater than the predetermined threshold value, and de-energizing the solenoid and transmitting a first signal to a control unit.

BRIEF DESCRIPTION OF THE DRAWINGS

So that the manner in which the features and advantages of embodiments of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention, and, therefore, are not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention, however, may be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout this description. Prime notation, if used, indicates similar elements in alternative embodiments.

Figure 1:
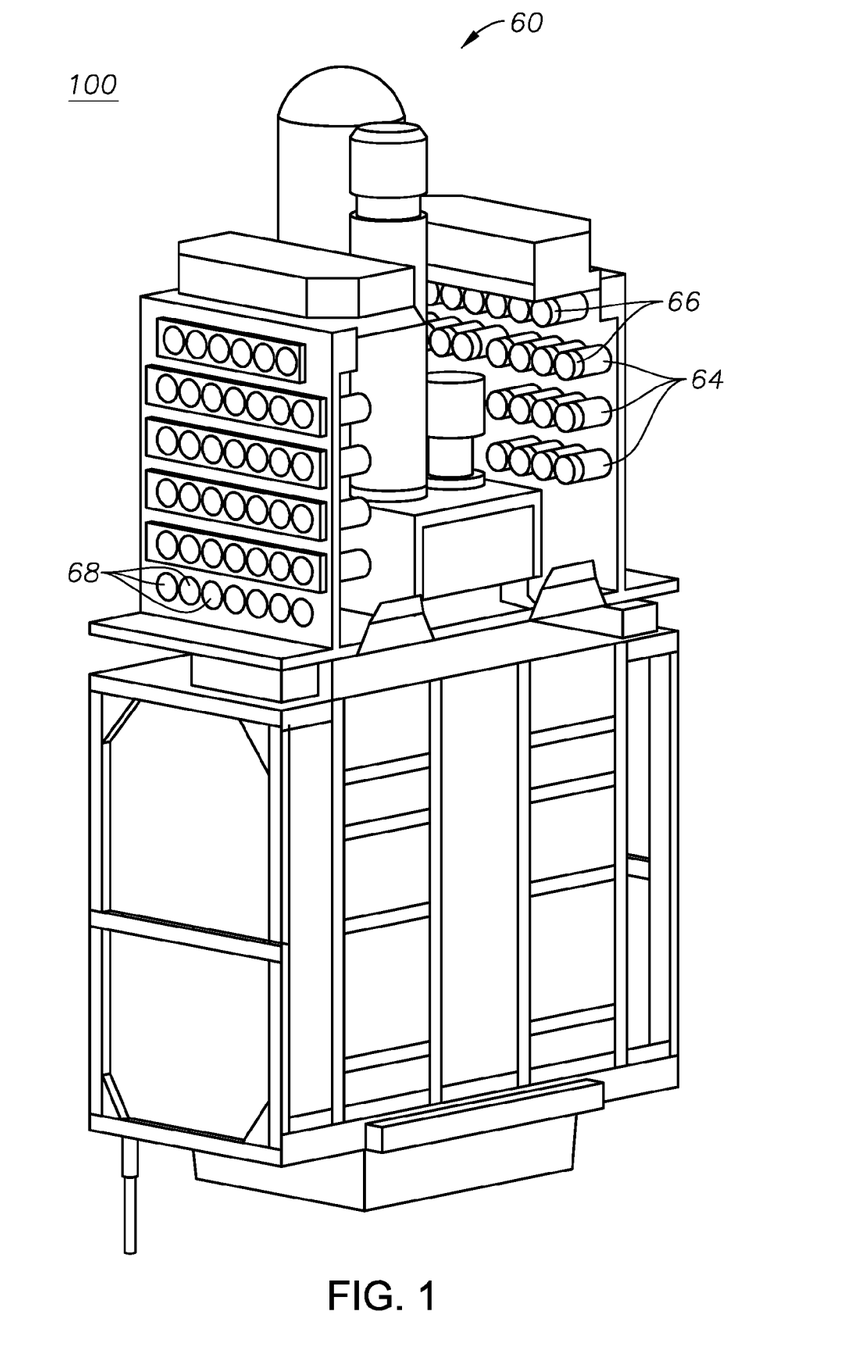
FIG. 1 is a schematic diagram of an example subsea system including a blowout preventer (BOP) having a plurality of solenoid valves and a plurality of pressure transducers, according to one or more example embodiments of the disclosure.

FIG. 1 illustrates an example system 100 for handling overcurrent and undercurrent conditions in subsea control subsystem components, according to one example embodiment of the disclosure. System 100 may include a blow out preventer (BOP) 60, which may include a plurality of solenoid valves 64 and a plurality of pressure transducers 68. Many configurations of one or more solenoid valves 64 and one or more pressure transducers 68 can be used without such configurations falling outside the scope of the invention. Disposed within each solenoid valve 64 is a solenoid 66. A solenoid valve 64 closes upon energization of its respective solenoid 66.

Figure 2:
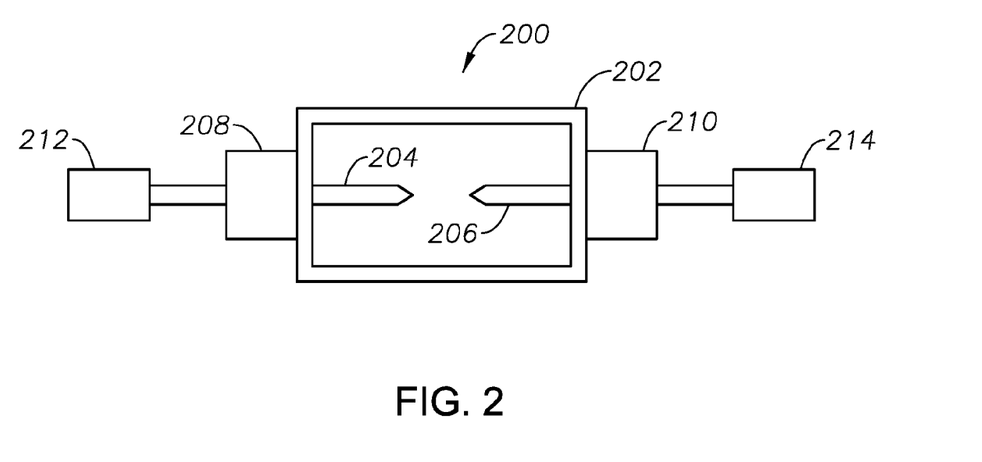
FIG. 2 is a schematic diagram of an example casing shear ram in a BOP using the systems and methods according to one or more example embodiments of the disclosure.

FIG. 2 is a schematic diagram of a subsea control subsystem component, such as a casing shear ram 200, in a BOP 60 as shown in FIG. 1. Casing shear ram 200 may include a casing or valve body 202 and two or more blades or plates 204, 206. The blades or plates 204, 206 are driven by hydraulic valves or pistons 208, 210, respectively. The hydraulic valves or pistons 208, 210 may be moved by opening solenoid valves 212, 214, respectively, when the hydraulic fluid is allowed to pass by energization of their respective solenoids. Solenoid valves 212, 214 are similar to the valves 64 illustrated in FIG. 1, and operate according to methods disclosed in this disclosure. Although only a casing shear ram 200 is illustrated in FIG. 2, the plurality of downstream BOP components may alternately include other components, such as one or more rams including blind shear, casing shear, pipe, and test rams, and shear seal valves, sub-plate mounted (SPM) valves, multiple position locking (MPL) components, flow meters, high-temperature and high-pressure probes, transducers, ram packers, packing units, shuttle valves, and regulators.

Figure 3:
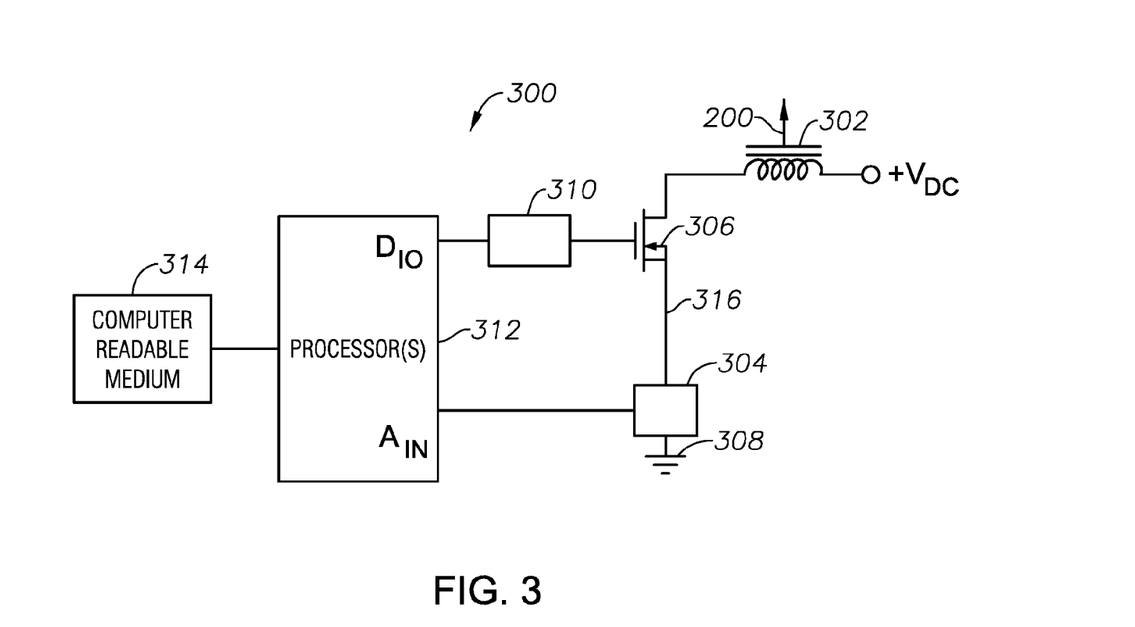
FIG. 3 is a circuit diagram illustrating a system for handling overcurrent and undercurrent conditions in subsea control subsystem components, according to one or more example embodiments of the disclosure.

FIG. 3 is a circuit diagram illustrating a system 300 for handling overcurrent and undercurrent conditions in subsea control subsystem components, such as the casing shear ram 200, according to one or more example embodiments of the disclosure. System 300 may include a solenoid valve 302, which may drive the subsea control subsystem components, such as the casing shear ram 200. Solenoid valve 302 solenoid may receive power from a current source, such as a subsea electronics module (SEM, not shown) or the any other current source. Solenoid valve 302 may function similar to solenoid valves 212, 214 illustrated in FIG. 2 and solenoid valves 64 illustrated in FIG. 1, for example.

The BOP may further include a pair of control pods (illustrated in FIG. 9) to control the downstream BOP components, such as the casing shear ram 200. System 100 may also include one or more current sensors 304 that may be operably connected to one or more solenoids in the solenoid valves 302 and configured to measure input current going into the one or more solenoids, 302 through line 316, which may be grounded at 308. System 300 may also include one or more processors 312 that may be operatively coupled to the one or more current sensors 304, and a non-transitory computer-readable medium 314 that may be in communication with the one or more processors 312. The computer readable medium 314 may have stored thereon a set of computer executable instructions that when executed cause the one or more processors 312 to perform a set of operations.

Current sensor 304 may be coupled to solenoid valve 302 solenoid via a switch 306, which can be any regular switch or a field effect transistor (FET) or a metal oxide semiconductor FET (MOSFET), to control the energization and de-energization of the solenoid within solenoid valve 302. For example, when the switch 306 is closed, the solenoid within solenoid valve 302 is energized. Similarly, when the switch 306 is open, the circuit is an open circuit and so the solenoid within solenoid valve 302 will be de-energized. The switch 306 may be controlled, for example opened and closed, using control signals coming from the processor 312. System 300 may optionally include a gate driver 310 may be used to control the switch 306.

According to one example embodiment, when current sensor 304 senses that the input current to solenoid valve 302 solenoid on line 316 is above a threshold value, the sensor 304 sends a signal to processor 312 indicating an overcurrent condition. Processor 312, using the logic or computer executable instructions stored thereon, opens or closes the switch 306 based on the magnitude of current detected by current sensor 304. In one example embodiment, the current sensor 304 may determine that an input current to the one or more solenoid valves 302 solenoid is greater than a predetermined threshold value, and send a signal to the processor 312. The processor 312 may de-energizing the solenoid upon receiving this signal.

Figure 4A:
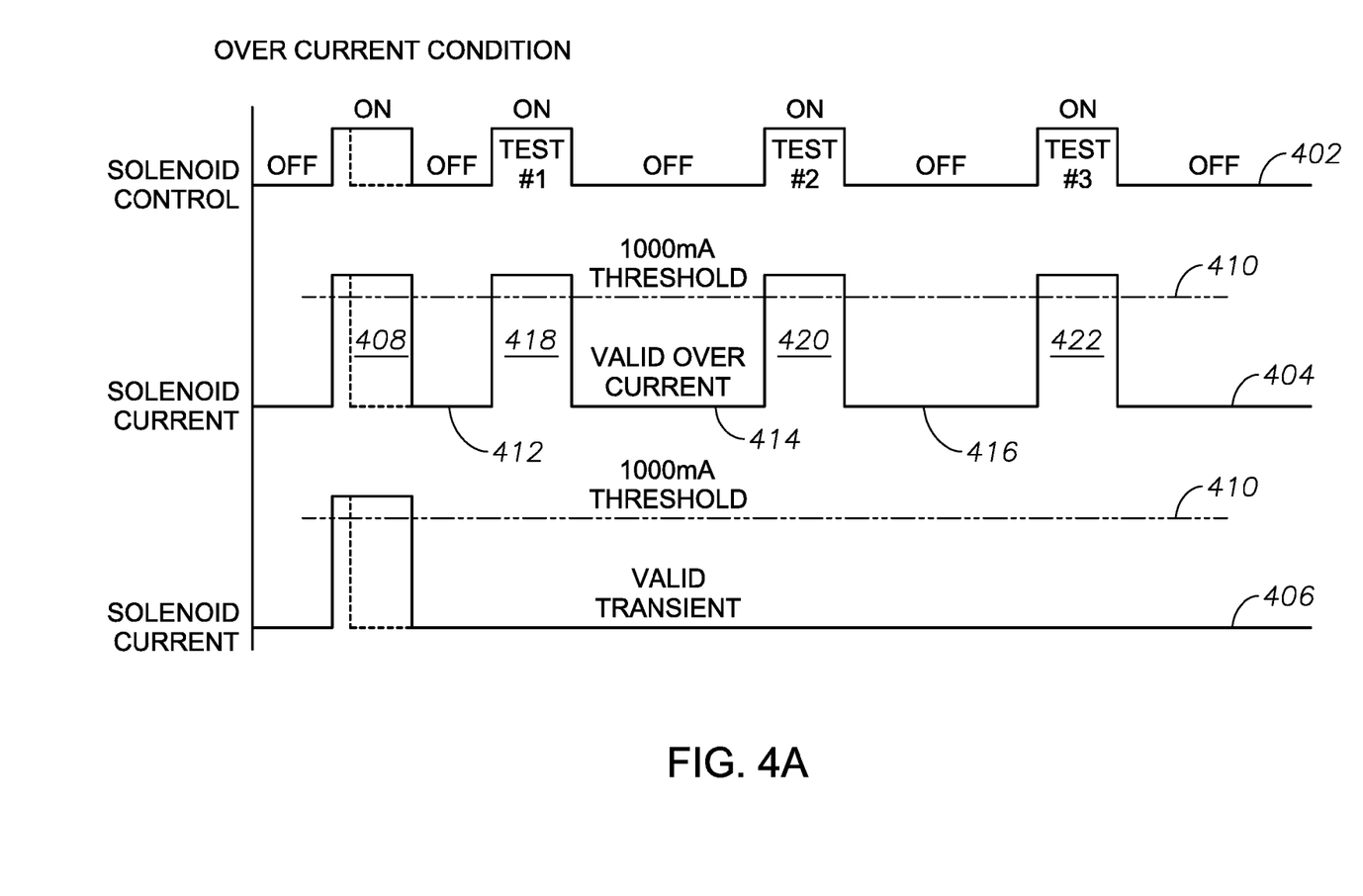
FIG. 4A illustrates example duty cycles in a system for handling an overcurrent condition in subsea control subsystem components, according to one or more example embodiments of the disclosure.

FIG. 4A illustrates example duty cycles in a system for handling an overcurrent condition in subsea control subsystem components, according to one or more example embodiments of the disclosure. Solenoid control, which includes an opening and closing switch that powers the solenoid on and off, is illustrated on line 402. In one example embodiment, when the solenoid is energized at 408 the current sensor may sense that the input current to the solenoid is over a threshold value 410, for example about 1000 mA or more. The current sensor may send the signal to the processor, and the processor may de-energize the solenoid for a period of time 412 on solenoid current line 404. In order to verify that this instance is a valid overcurrent condition, the processor may re-energize the solenoid valve at least three times 418, 420, 422 after the first period of time 412. If the processor determines that during each of the at least three times the input current to the one or more solenoids is greater than the predetermined threshold value 410, then the processor treats the condition as a valid overcurrent condition, de-energizes the one or more solenoids, and transmits a signal indicating an overcurrent condition to the control pod. As illustrated in FIG. 4A, the time periods for de-energizing the solenoid 412, 414, 416 may be of equal or unequal lengths, and may be varied depending on the thermal recovery of the components involved. Similarly, the time periods for re-energizing the solenoid 418, 420, 422 may be of equal or unequal lengths, and may be varied depending on the thermal recovery of the components involved. In other words, the duty cycle of the solenoids involved may be intermittent, and may be varied depending on the thermal recovery of the components involved.

In another example embodiment as shown on line 406, if the processor determines that during at least one of the at least three times the input current to the one or more solenoids is lower than or equal to the predetermined threshold value 410, then the processor re-energizes the one or more solenoids and transmits a signal indicating that it is a valid transient condition to the control pod.

Figure 4B:
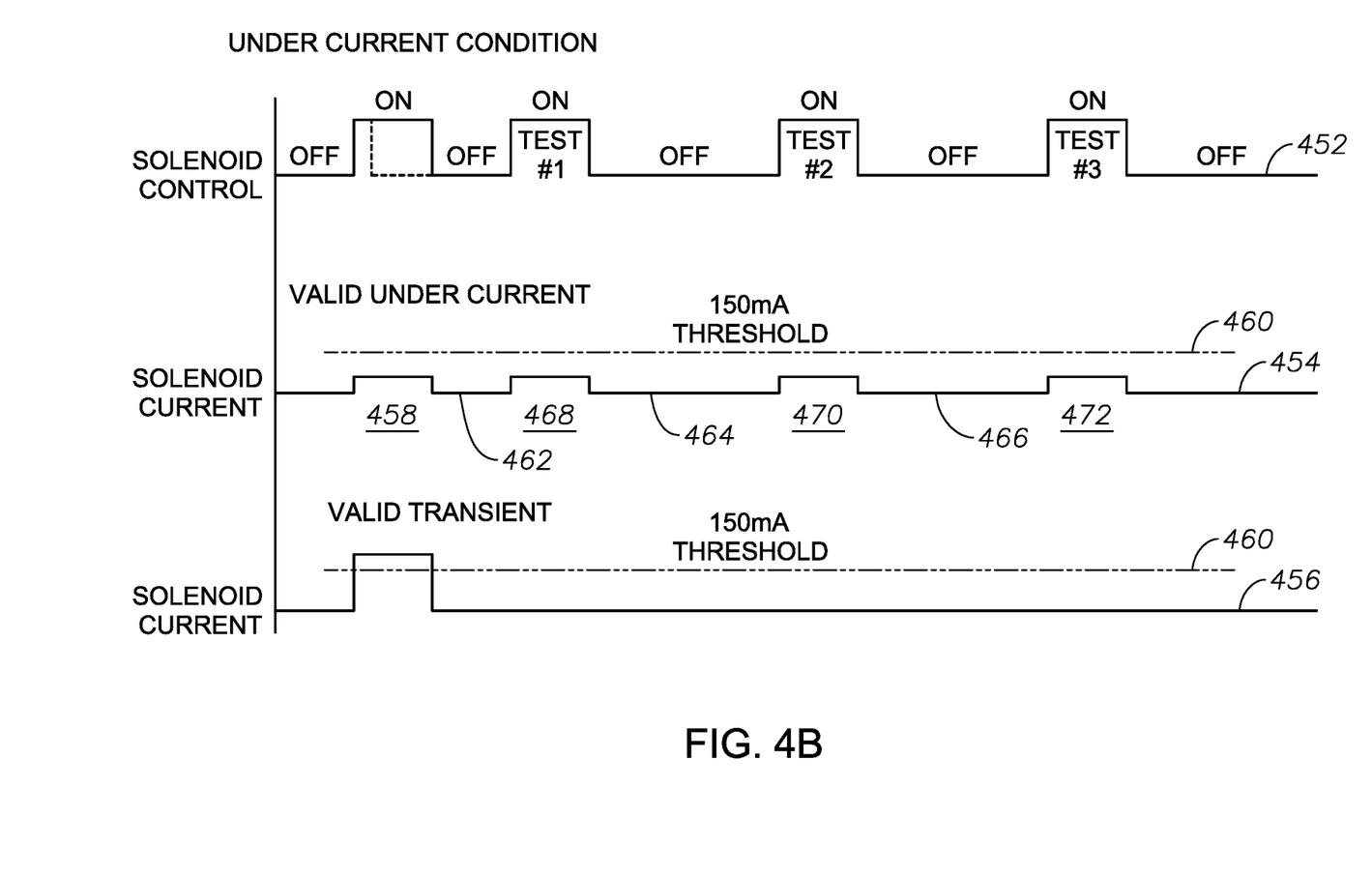
FIG. 4B illustrates example duty cycles in a system for handling an undercurrent condition in subsea control subsystem components, according to one or more example embodiments of the disclosure.

FIG. 4B illustrates example duty cycles in a system for handling an undercurrent condition in subsea control subsystem components, according to one or more example embodiments of the disclosure. Solenoid control, which includes an opening and closing switch that powers the solenoid on and off, is illustrated on line 452. In one example embodiment, when the solenoid is energized at 458 the current sensor may sense that the input current to the solenoid is lower than a threshold value 460, for example about 150 mA or less. The current sensor may send the signal to the processor, and the processor may de-energize the solenoid for a period of time 462 on solenoid current line 454. In order to verify that this instance is a valid undercurrent condition, the processor may re-energize the solenoid at least three times 468, 470, 472 after the first period of time 462. If the processor determines that during each of the at least three times the input current to the one or more solenoids is lower than the predetermined threshold value 460, then the processor treats the condition as a valid undercurrent condition, and de-energizes the one or more solenoids and transmits a signal indicating an undercurrent condition to the control pod. As illustrated in FIG. 4B, the time periods for de-energizing the solenoid 462, 464, 466 may be of equal or unequal lengths, and may be varied depending on the thermal recovery of the components involved. Similarly, the time periods for re-energizing the solenoid 468, 470, 472 may be of equal or unequal lengths, and may be varied depending on the thermal recovery of the components involved. In other words, the duty cycle of the solenoids involved may be intermittent, and may be varied depending on the thermal recovery of the components involved.

In another example embodiment as shown on line 456, if the processor determines that during at least one of the at least three times the input current to the one or more solenoids is greater than or equal to the predetermined threshold value 460, then the processor re-energizes the one or more solenoids and transmitting a signal indicating that it is a valid transient condition to the control pod.

Figure 5:
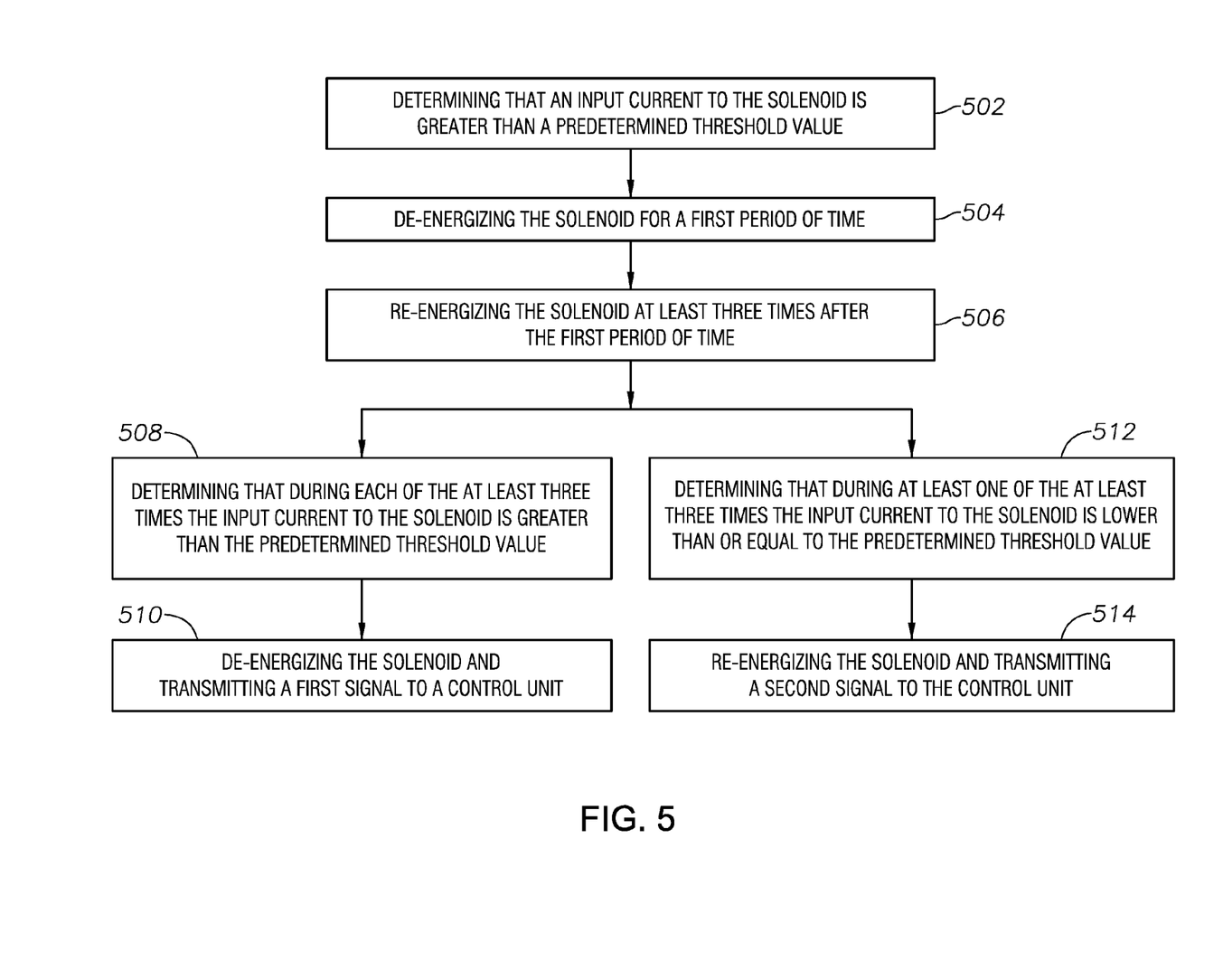
FIG. 5 illustrates example methods steps involved in a method for handling an overcurrent condition in subsea control subsystem components, according to one or more example embodiments of the disclosure.

Another example embodiment is a non-transitory computer-readable medium including instructions stored thereon, which when executed by the processor operatively coupled to the current sensor configured to measure the input current going into the solenoid, cause the processor to perform a set of operations. FIG. 5 illustrates example methods steps involved in a method for handling an overcurrent condition in subsea control subsystem components, according to one or more example embodiments of the disclosure. At step 502, the processor may determine that the input current to the solenoid is greater than a predetermined threshold value, and de-energize the solenoid for a first period of time at step 504. At step 506 the processor may re-energize the solenoid at least three times after the first period of time. At step 508, the processor may determine that during each of the at least three times the input current to the solenoid is greater than the predetermined threshold value, de-energize the solenoid, and transmit a first signal to a control unit at step 510.

Alternatively, or in addition, at step 512 if the processor determines that during at least one of the at least three times the input current to the one or more solenoids is lower than or equal to the predetermined threshold value, then the processor, at step 514, re-energizes the one or more solenoids and transmitting a signal indicating that it is a valid transient condition to the control unit.

Figure 6:
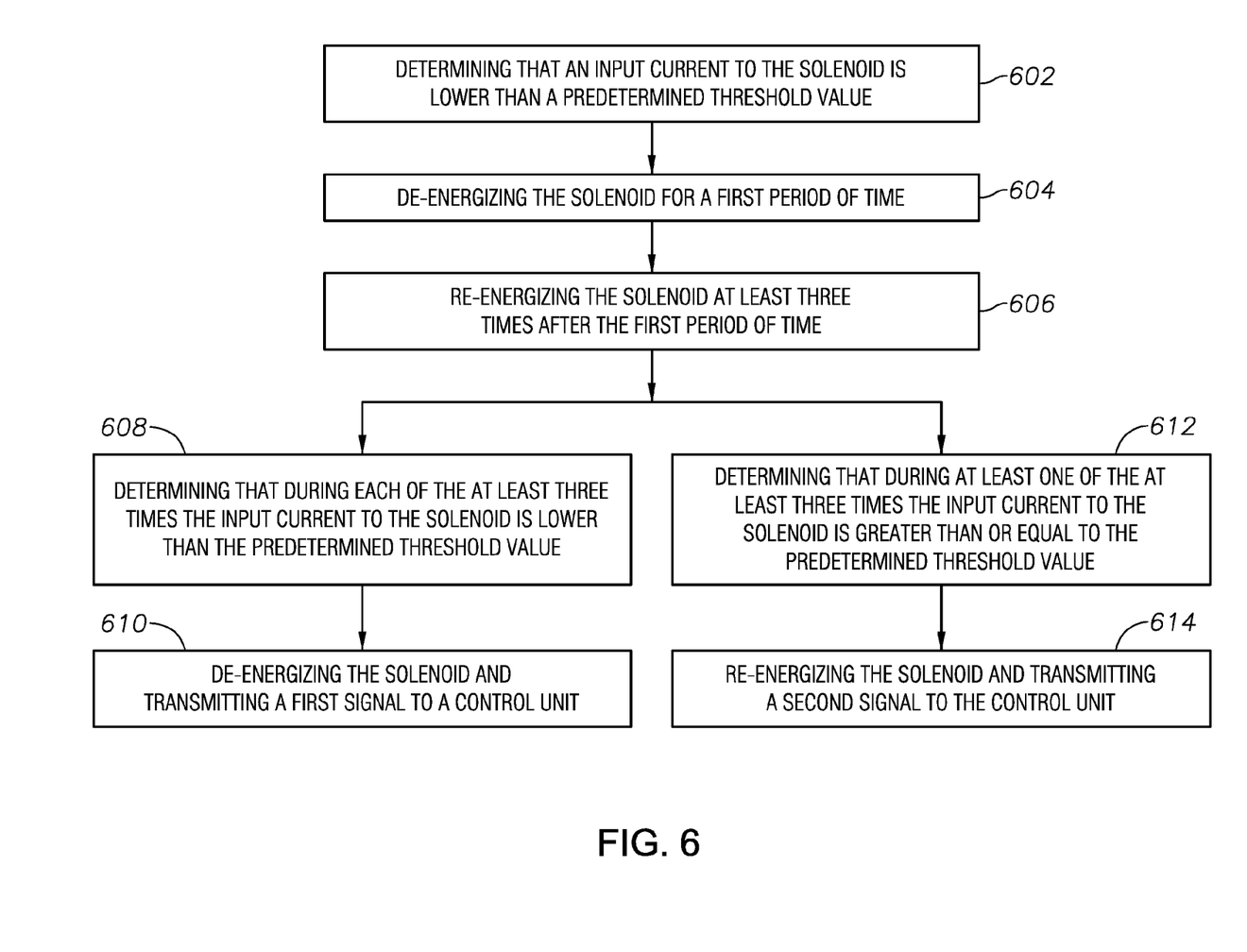
FIG. 6 illustrates example methods steps involved in a method for handling an undercurrent condition in subsea control subsystem components, according to one or more example embodiments of the disclosure.

Another example embodiment is a non-transitory computer-readable medium including instructions stored thereon, which when executed by the one or more processors operatively coupled to the current sensor configured to measure an input current going into the solenoid, cause the one or more processors to perform a set of operations. FIG. 6 illustrates example method steps involved in a method for handling an undercurrent condition in subsea control subsystem components, according to one or more example embodiments of the disclosure. For example, at step 602, the method can include determining, by the processor, that the input current to the solenoid is lower than a predetermined threshold value. At step 604, the processor de-energizes the solenoid for a first period of time. At step 606 the processor re-energizes the solenoid at least three times after the first period of time. At step 608, upon determining that during each of the at least three times the input current to the solenoid is lower than the predetermined threshold value, and the processor de-energizes the solenoid and transmits a first signal to a control unit at step 610.

Alternatively, or in addition, at step 612 if the processor determines that during at least one of the at least three times the input current to the one or more solenoids is greater than or equal to the predetermined threshold value, then the processor, at step 614, re-energizes the one or more solenoids, and transmits a signal indicating that it is a valid transient condition to the control unit.

A solenoid valve as described herein is typically an integrated device containing an electromechanical solenoid which actuates either a pneumatic or hydraulic valve in a blow out preventer (BOP) in oil and gas production equipment. A solenoid valve may be an electromechanically operated valve. The valve may be controlled by an electric current through a solenoid: in the case of a two-port valve the flow may be controlled by either opening or closing the valve; in the case of a three-port valve, the outflow may be switched between the two outlet ports. Multiple solenoid valves can be placed together on a manifold. The solenoid valve may include a plunger-type actuator, pivoted-armature actuators, or a rocker actuator as may be apparent to one of skill in the art.

In certain embodiments, the subsea electronics module (SEM) software routine can command the solenoid to be energized or de-energized three or more times. The timing of this cycle can be 400 ms energized, 5000 ms de-energized, 400 ms energized, 5000 ms de-energized, 400 ms energized, and de-energized. During each energized period, the software can test for the overcurrent condition. If an overcurrent condition does not occur on all three consecutive tests, it is considered a transient fault, and the software command is not latched in the de-energized state, and an alarm condition can be indicated on the human machine interface (HMI) screen to alert the operator. Operator intervention is preferable to assess the risk in the loss of a function. The operator can be able to manually test the solenoid, or leave it in an inoperable state. The command can then be given to turn the solenoid on, thereby re-applying hydraulic pressure for the function.

If an overcurrent is detected the solenoid is de-energized and then re-energized three times to test for a valid condition or a false condition. The time interval between re-energizing the solenoid is relatively long to allow the effects of component overheating to be minimized, thereby extending their lifetime. If the condition is valid the solenoid will be de-energized. If it is a false condition, the solenoid will be re-energized.

According to alternate embodiments of the invention, a method of handling an undercurrent condition is described herein. If after the initial command to energize a solenoid and an undercurrent condition (e.g., a current less than about 150 mA) is detected, the software will acknowledge the condition by commanding the solenoid be de-energized. The undercurrent condition initially detected can be tested to verify if it was a transient or a valid fault. The SEM software routine can test to verify if either condition occurred.

An undercurrent is detected when the solenoid current is below a defined threshold. Again, the solenoid is de-energized and then re-energized three times in the same manner as with an overcurrent test. If the condition is valid the solenoid will be de-energized.

The SEM software routine can command the solenoid to be energized or de-energized three or more cycles. The timing of these cycles can be 400 ms energized, and 5000 ms de-energized. During each energized period, the software can test for undercurrent condition. If the condition does not occur after three or more consecutive tests, it must be considered a transient, and the software command is not latched in the de-energized state, and an alarm condition can be indicated on the HMI screen to alert the operator. Operator intervention is preferred to assess the risk in the loss of a function. The operator can manually test the solenoid, or leave it in an inoperable state. The command can then be given to energize the solenoid, thereby re-applying hydraulic pressure for that function.

Some features of the example embodiments disclosed herein include the ability to detect overcurrent and/or undercurrent condition in solenoids, applying intermittent duty cycle if an overcurrent/undercurrent condition detected, calculating duty cycle to avoid overheating of solenoids, and confirming if the fault condition is valid or false.

Example embodiments disclosed eliminate false positive or nuisance transient conditions, and reduce the possibility of overheating circuit components. In addition, example embodiments described herein increase the mean time between failures (MTBF) by reducing electrical stress on circuit components. This method of handling an overcurrent and undercurrent condition enhances the system's ability to recover from these types of faults thus reducing heat buildup in the current carrying components and thereby preventing further damage.

Figure 7:
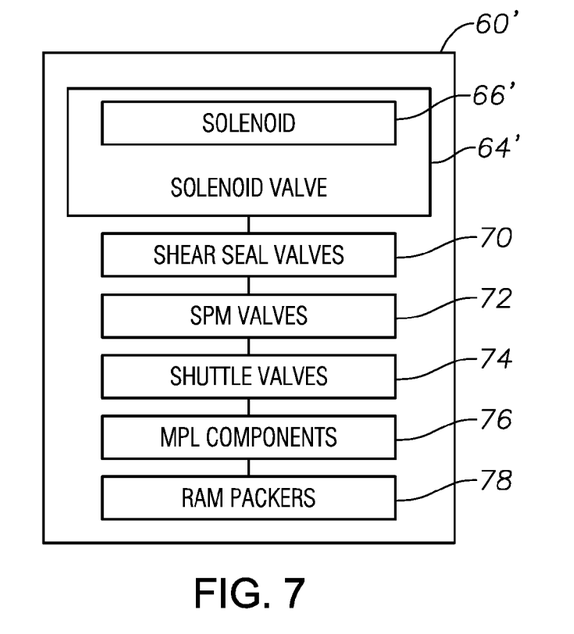
FIG. 7 is a schematic illustration of a blowout preventer including a solenoid valve and a number of downstream BOP components, according to one or more example embodiments of the disclosure.

FIG. 7 provides a schematic of a blowout preventer 60' according to an embodiment of the invention. A solenoid valve 64' and associated solenoid 66' disposed within are shown. A plurality of downstream BOP components also are illustrated. For example, in an exemplary BOP configuration, downstream BOP components can include shear seal valves 70, SPM valves 72, shuttle valves 74, MPL components 76, and ram packers 78. A schematic is provided as many configurations of these components within a BOP are within the skill of the art.

Figure 8:
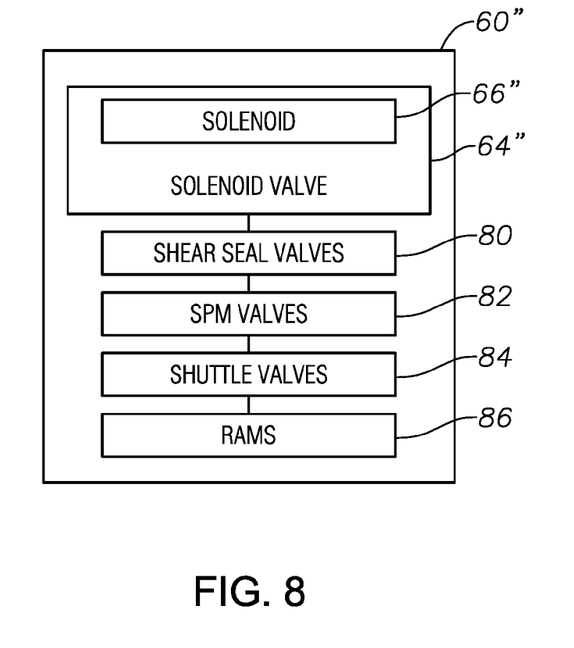
FIG. 8 is a schematic illustration of a blowout preventer including a solenoid valve and a number of downstream BOP components, according to one or more example embodiments of the disclosure.

FIG. 8 provides another schematic of a blowout preventer 60" according to another embodiment of the invention. A solenoid valve 64" and associated solenoid 66" disposed within are shown. A plurality of downstream BOP components also are illustrated. For example, in an exemplary BOP configuration, downstream BOP components can include shear seal valves 80, SPM valves 82, shuttle valves 84, and casing shear ram 86. A schematic is provided as many configurations of these components within a BOP are within the skill of the art.

Figure 9:
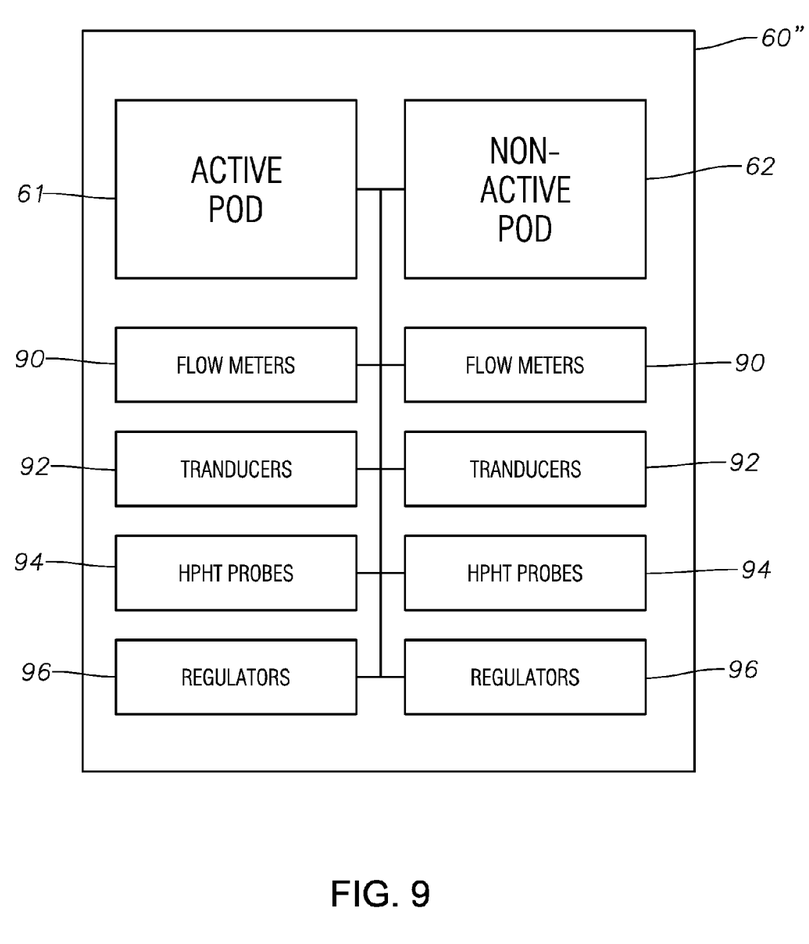
FIG. 9 is a schematic illustration of a blowout preventer including an active and non-active control pod and various additional downstream BOP components, according to one or more example embodiments of the disclosure.

FIG. 9 provides another schematic of a blowout preventer 60''' according to an embodiment of the invention. A pair of control pods 61, 62 are shown, including an active pod 61 and a non-active pod 62. A plurality of downstream BOP components also are illustrated associated the pair of control pods 61, 62. For example, in an exemplary BOP configuration, downstream BOP components can include flow meters 90, various transducers 92, high-pressure-high-temperature (HPHT) probes 94, and regulators 96. A schematic is provided as many configurations of these components within a BOP are within the skill of the art. It is stressed that such a configuration is merely illustrative and designed to demonstrate to the reader that each pod is associated with a set of components. It will be understood by one of skill in the art that in certain embodiments many, if not all, components associated with one pod can be associated with the other pods as well.

In the drawings and specification, there have been disclosed a typical preferred embodiment of the invention, and, although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A system for handling an overcurrent condition in subsea control subsystem components, the system comprising:

a blowout preventer (BOP) including one or more solenoid valves operably disposed within the BOP, each of the one or more solenoid valves configured to close upon energization of a respective one or more solenoids associated with the one or more solenoid valves, the BOP further including a plurality of downstream BOP components, one or more of the plurality of downstream BOP components being activated following energization of the respective one or more solenoids associated with the one or more solenoid valves, the BOP further including a pair of control pods to control downstream BOP components;

one or more current sensors operably connected to the one or more solenoids associated with the one or more solenoid valves and configured to measure input current going into the one or more solenoids;

one or more processors operatively coupled to the one or more current sensors; and a non-transitory computer-readable medium in communication with the one or more processors and having stored thereon a set of instructions that when executed cause the one or more processors to perform operations comprising:

determining that an input current to the one or more solenoids is greater than a predetermined threshold value;

de-energizing the solenoid for a first period of time;

re-energizing the solenoid at least three times after the first period of time;

determining that during each of the at least three times the input current to the one or more solenoids is greater than the predetermined threshold value; and de-energizing the one or more solenoids and transmitting a first signal to at least one of the control pods.

2. The system of claim 1, wherein the plurality of downstream BOP components include one or more of shear rams, shear seal valves, sub-plate mounted (SPM) valves, multiple position locking (MPL) components, flow meters, high-pressure and high-temperature probes, transducers, ram packers, packing units, shuttle valves, and regulators.

3. The system of claim 1, wherein the instructions further cause the one or more processors to perform operations comprising:

determining that during at least one of the at least three times the input current to the one or more solenoids is lower than or equal to the predetermined threshold value; and re-energizing the one or more solenoids and transmitting a second signal to at least one of the control pods.

4. The system of claim 1, wherein the at least three re-energizing periods are separated by de-energizing periods of equal or unequal length.

5. The system of claim 1, wherein the at least three re-energizing periods are of equal or unequal length.

6. The system of claim 1, wherein the predetermined threshold value is at least 1000 mA.

7. The system of claim 1, wherein the instructions further cause the one or more processors to perform operations comprising:

determining that an input current to the one or more solenoids is lower than a predetermined threshold value;

de-energizing the solenoid for a first period of time;

re-energizing the solenoid at least three times after the first period of time;

determining that during each of the at least three times the input current to the one or more solenoids is lower than the predetermined threshold value; and de-energizing the one or more solenoids and transmitting the first signal to at least one of the control pods.

8. A method for handling an overcurrent condition in a solenoid, the method comprising:

determining, by a current sensor operatively coupled to the solenoid, that an input current to the solenoid is greater than a predetermined threshold value;

de-energizing, by a processor operatively coupled to the current sensor, the solenoid for a first period of time;

re-energizing, by the processor, the solenoid at least three times after the first period of time;

determining, by the current sensor, that during each of the at least three times the input current to the solenoid is greater than the predetermined threshold value; and de-energizing, by the processor, the solenoid and transmitting a first signal to a control unit.

9. The method of claim 8, further comprising determining, by the current sensor, that during at least one of the at least three times the input current to the solenoid is lower than or equal to the predetermined threshold value; and re-energizing, by the processor, the solenoid and transmitting a second signal to the control unit.

10. The method of claim 8, wherein the at least three re-energizing periods are separated by de-energizing periods of equal or unequal length.

11. The method of claim 8, wherein the at least three re-energizing periods are of equal or unequal length.

12. The method of claim 8, wherein the predetermined threshold value is about 1000 mA.

13. The method of claim 8, further comprising:

determining, by the current sensor operatively coupled to the solenoid, that an input current to the solenoid is lower than a predetermined threshold value;

de-energizing, by a processor operatively coupled to the current sensor, the solenoid for a first period of time;

re-energizing, by the processor, the solenoid at least three times after the first period of time;

determining, by the current sensor, that during each of the at least three times the input current to the solenoid is lower than the predetermined threshold value; and de-energizing, by the processor, the solenoid and transmitting a first signal to a control unit.

14. A non-transitory computer-readable medium including instructions stored thereon, which when executed by one or more processors operatively coupled to a current sensor configured to measure an input current going into a solenoid, cause the one or more processors to perform operations comprising:

determining that the input current to the solenoid is greater than a predetermined threshold value;

de-energizing the solenoid for a first period of time;

re-energizing the solenoid at least three times after the first period of time;

determining that during each of the at least three times the input current to the solenoid is greater than the predetermined threshold value; and de-energizing the solenoid and transmitting a first signal to a control unit.

15. The non-transitory computer-readable medium of claim 14, wherein the instructions further cause the one or more processors to perform operations comprising:

determining that during at least one of the at least three times the input current to the solenoid is lower than or equal to the predetermined threshold value; and re-energizing the solenoid and transmitting a second signal to the control unit.

16. The non-transitory computer-readable medium of claim 14, wherein the at least three re-energizing periods are separated by de-energizing periods of equal or unequal length.

17. The non-transitory computer-readable medium of claim 14, wherein the at least three re-energizing periods are of equal or unequal length.

18. The non-transitory computer-readable medium of claim 14, wherein the predetermined threshold value is at least 1000 mA.

19. The non-transitory computer-readable medium of claim 14, wherein the instructions further cause the one or more processors to perform operations comprising:
- determining that the input current to the solenoid is lower than a predetermined threshold value;
- de-energizing the solenoid for the first period of time;
- re-energizing the solenoid at least three times after the first period of time;
- determining that during each of the at least three times the input current to the solenoid is lower than the predetermined threshold value; and
- de-energizing the solenoid and transmitting the first signal to a control unit.

20. The non-transitory computer-readable medium of claim 19, wherein the instructions further cause the one or more processors to perform operations comprising:
- determining that during at least one of the at least three times the input current to the solenoid is greater than or equal to the predetermined threshold value; and
- re-energizing the solenoid and transmitting a second signal to the control unit.

* * * * *